United States Patent
De Boer et al.

(10) Patent No.: US 9,890,297 B2
(45) Date of Patent: Feb. 13, 2018

(54) OXIDATIVELY CURABLE COATING COMPOSITION

(71) Applicant: Chemsenti Limited, London (GB)

(72) Inventors: Johannes Wietse De Boer, Leiden (NL); Ronald Hage, Leiden (NL); Karin Maaijen, Leiden (NL)

(73) Assignee: Chemsenti Limited, London (GB)

(*) Notice: Subject to any disclaimer, the term of this patent is extended or adjusted under 35 U.S.C. 154(b) by 0 days.

(21) Appl. No.: 14/819,506

(22) Filed: Aug. 6, 2015

(65) Prior Publication Data

US 2015/0337162 A1    Nov. 26, 2015

Related U.S. Application Data

(63) Continuation of application No. PCT/GB2014/050270, filed on Jan. 31, 2014.

(30) Foreign Application Priority Data

Feb. 11, 2013 (EP) ..................................... 13154852

(51) Int. Cl.
    *C09D 167/08*      (2006.01)
    *C09D 167/02*      (2006.01)

(52) U.S. Cl.
     CPC ......... *C09D 167/02* (2013.01); *C09D 167/08* (2013.01)

(58) Field of Classification Search
     CPC .................................................. C09D 167/08
     See application file for complete search history.

(56) References Cited

U.S. PATENT DOCUMENTS

| | | | | |
|---|---|---|---|---|
| 8,907,082 B2 * | 12/2014 | Hage | .................... | C07D 403/06 540/474 |
| 9,150,705 B2 * | 10/2015 | Hage | .................... | C08K 5/0025 |
| 2001/0008932 A1 | 7/2001 | Bakkeren et al. | | |
| 2005/0245639 A1 | 11/2005 | Oostveen et al. | | |

FOREIGN PATENT DOCUMENTS

| | | | | |
|---|---|---|---|---|
| EP | 1382648 A1 | 1/2004 | | |
| EP | 2474578 A1 | 7/2012 | | |
| NL | WO 2012093250 A1 * | 7/2012 | ............... | C09D 7/04 |
| WO | 2000/11090 A1 | 3/2000 | | |
| WO | 2003/029371 A1 | 4/2003 | | |
| WO | 2003/093384 A1 | 11/2003 | | |
| WO | 2007/024592 A1 | 3/2007 | | |
| WO | WO-2008/003652 A1 | 1/2008 | | |
| WO | 2008/127739 A1 | 10/2008 | | |
| WO | 2011/098583 A1 | 8/2011 | | |
| WO | 2011/098584 A1 | 8/2011 | | |
| WO | 2011/098587 A1 | 8/2011 | | |
| WO | 2012/003712 A1 | 1/2012 | | |
| WO | WO-2012/079624 A1 | 6/2012 | | |
| WO | 2012/092034 A2 | 7/2012 | | |

OTHER PUBLICATIONS

Bieleman, J.H. et al., "Additives in Plastics and Paints: Driers," Chimia, 2002, vol. 56, 184-190.
Bieleman, J.H. et al., "Progress in the Development of Cobalt-free Drier Systems," Macromol. Symp., 2002, vol. 187, 811-821.
Canty, W.H. et al., "Drier Catalyst Activity in Organic Coatings," Ind. Eng. Chem., 1960, vol. 52, 67-70.
Oyman, Z.O. et al., "Oxidative drying of alkyd paints catalysed by a dinuclear manganese complex (MnMeTACN)," Surface Coatings International Part B: Coatings Transactions, 2005, vol. 88, 269-275.
van Gorkum, R. et al., "Fast Autoxidation of Ethyl Linoleate Catalyzed by [Mn(acac)3] and Bipyridine: A Possible Drying Catalyst for Alkyd Paints," Inorg. Chem., 2004, vol. 43, 2456-2458.
van Gorkum, R. et al., "The oxidative drying of alkyd paint catalysed by metal complexes," Coordination Chemistry Reviews, 2005, vol. 249, 1709-1728.
Weissenborn, P.K. et al., "Emulsification, drying and film formation of alkyd emulsions," Progress in Organic Coatings, 2000, vol. 40, 253-266.
U.S. Appl. No. 14/343,174, US-2014-0329665-A1.
U.S. Appl. No. 14/819,510, US-2015-0337165-A1.
U.S. Appl. No. 14/819,514, US-2015-0337163-A1.
U.S. Appl. No. 14/974,212, US-2016-0102276-A1.
U.S. Appl. No. 15/044,462, US-2016-0160160-A1.
U.S. Appl. No. 15/115,374.

* cited by examiner

*Primary Examiner* — Michael Pepitone
(74) *Attorney, Agent, or Firm* — McCarter & English, LLP; Yu Lu; Wei Song

(57) ABSTRACT

The present invention relates to an oxidatively curable coating formulation comprising an oxidatively curable alkyd-based resin and a bis-triazacyclononane-based chelant, which chelant may optionally be complexed with a suitable transition metal ion, particularly manganese. The formulations may be paints or other oxidatively curable coating compositions. The invention also provides methods for making such formulations and compositions resultant from the curing of such formulations.

14 Claims, No Drawings

OXIDATIVELY CURABLE COATING COMPOSITION

REFERENCE TO RELATED APPLICATIONS

This application is a continuation application of International Application No. PCT/GB2014/050270, filed on Jan. 31, 2014, which claims priority to European Patent Application No. EP 13154852.1, filed on Feb. 11, 2013, the entire contents of each of which are incorporated herein by reference.

FIELD OF THE INVENTION

The present invention relates to an oxidatively curable coating formulation comprising an oxidatively curable alkyd-based resin and a bis-triazacyclononane-based chelant, which chelant may optionally be complexed with a suitable transition metal ion. The formulations may be paints or other oxidatively curable coating compositions. The invention also provides methods for making such formulations and compositions resultant from the curing of such formulations.

BACKGROUND OF THE INVENTION

Alkyd resins are a well understood and dominant binder in many oxidatively curable paints and other solvent-based coatings. Alkyd emulsion paints, in which the continuous phase is aqueous, are also widely available commercially. Alkyd resins are produced by the reaction of polyols with carboxylic acids or anhydrides. To make them susceptible to what is commonly referred to as a drying process, some alkyd resins are reacted with unsaturated triglycerides or other source of unsaturation. Plant and vegetable oils, such as linseed oil, are frequently used as the source of triglycerides. In these drying processes, unsaturated groups, in particular carbon-carbon double bonds, can react with oxygen from the air, causing the oils to crosslink, forming a three-dimensional network, and harden. This oxidative curing process, although not drying, gives the appearance of drying and is often and herein referred to as such. The length of time required for drying depends on a variety of factors, including the constituents of the alkyd resin formulation and the amount and nature of the liquid continuous phase (e.g., solvent) in which the alkyd resin is formulated.

Film formation results from the autoxidation and polymerization chemistries that occur during the drying of alkyd-based resins. It will proceed in the absence of catalysis. However, it is customary to include in formulations of curable resins small, i.e. catalytic, quantities of optionally organic metal salts, often referred to as metal driers, which catalyze the polymerization of unsaturated material so as to form the three-dimensional network.

Driers used for solvent-based coatings typically include alkyl carboxylates, typically $C_6$-$C_{18}$ carboxylates, of metals such as cobalt, manganese, lead, zirconium, zinc, vanadium, strontium, calcium and iron. Such metal carboxylates are often referred to as metal soaps. Redox-active metals, such as manganese, iron, cobalt, vanadium and copper enhance radical formation, and thus the oxidative curing process, whilst so-called secondary driers (sometimes referred to as auxiliary driers), such as complexes based on strontium, zirconium and calcium, enhance the action of the redox-active metals. Often these soaps are based on medium-chain alkyl carboxylates such as 2-ethyl-hexanoate. The lipophilic units in such soaps enhance the solubility of the drier in solvent-based paints and other oxidatively curable coating compositions.

As well as metal soaps, a variety of metal driers that are redox metal complexes containing organic ligands can be used as driers, for example manganese complexes comprising 2,2'-bipyridine.

The formation of a skin or lumpy matter is a problem observed in many oil-based (i.e. organic solvent-based) formulations, and in particular in organic solvent-based alkyd resins, as a consequence of oxidation during storage or transportation. Oxidative polymerization reactions can thus lead to the skin formation before application, as well as the intended drying after application. As alluded to above, these polymerization reactions can be triggered by radicals generated by the action of metal-based driers, for example cobalt-, manganese- or iron-containing driers. In other words, the cause of the skin formation is often associated with the presence of metal driers.

Skin formation during manufacture and storage of air-drying paints and other coatings, in particular of alkyd-based resins, is clearly undesirable. Skin formation can lead to material losses and usage problems, such as surface irregularity after application owing to skin particles remaining in the paint.

Addition of compounds that quench the radicals formed during the storage or transportation processes reduce the skin-forming tendencies of such formulations. Many anti-skinning agents are therefore antioxidants. However, addition of such antiskinning antioxidants can also slow the drying desired after application, by reducing the activity of the metal driers.

Oximes, and in particular methylethylketoxime (MEKO), are known to reduce skin formation considerably, particularly with cobalt-based driers. It is understood that the oxime binds to the metal ion during storage of the resin, thereby preventing the metal drier from reacting with oxygen and the substrate for radical formation that otherwise leads to polymerization and skin formation. Upon application of the paint or other coating as a thin layer on a surface, the MEKO can evaporate. In this way, skinning can be prevented or ameliorated, but the cobalt soap can function, after application, as a polymerization catalyst (see J H Bieleman in *Additives in Plastics and Paints, Chimia,* 56:184 (2002)).

Antiskinning agents, or ways to address the problem of skinning, other than those involving the use of oximes such as MEKO, have been described. For example, WO 00/11090 A1 (Akzo Nobel N.V.) describes the use of 1,3-diketones, pyrazoles and imidazoles to reduce the skinning properties; WO 2007/024592 A1 (Arkema Inc.) describes the use of isoascorbate as an antiskinning agent and a co-promoter of metal-based driers; and WO 2008/127739 A1 (Rockwood Pigments NA, Inc.) describes the use of hydroxylamine as an antiskinning agent. Whilst such additives reduce the tendency towards skinning, they can lead to decreased performance of the metal drier if their degree of incorporation is too great and they do not evaporate sufficiently during the coating (e.g., paint) application.

Whilst cobalt driers have been employed for many years as paint driers, there is a desire to develop alternatives, not least since cobalt soaps may need to be registered as carcinogenic materials. Iron- and manganese-based paint driers in particular have received considerable attention in recent years in the academic and patent literature as alternatives to cobalt-based driers. For some recent scientific publications addressing this topic in detail see publications by J H Bieleman (in *Additives in Plastics and Paints,*

Chimia, infra)); J H Bieleman (Marcomol. Symp., 187:811 (2002)); and R E van Gorkum and E Bouwman (Coord. Chem. Rev., 249:1709 (2005)).

WO 03/093384 A1 (Ato B.V.) describes the use of reducing biomolecules in combination with transition-metal salts or complexes based on pyrazoles, aliphatic and aromatic amines, 2,2'-bipyridine, 1,10'-phenanthroline and 1,4,7-trimethyl-1,4,7-triazacyclononane (Me$_3$TACN).

WO 03/029371 A1 (Akzo Nobel N.V.) describes the use of complexes comprising Schiff base compounds to enhance the drying of coatings, in which complexes at least one solubilizing group is covalently bound to the organic ligand.

EP 1382648 A1 (Universiteit Leiden) describes the use of manganese complexes with acetylacetonate and bidentate nitrogen donor ligands in paint drying.

WO 2008/003652 A1 (Unilever PLC et al.) describes the use of tetradentate, pentadentate or hexadentate nitrogen ligands bound to manganese and iron as siccative for curing alkyd-based resins.

Oyman et al. describe the oxidative drying of alkyd paints by [Mn$_2$(μ-O)$_3$(Me$_3$tacn)$_2$](PF$_6$)$_2$(Z O Oyman et al., *Surface Coating International Part B—Coatings Transaction*, 88:269 (2005)). WO 2011/098583 A1, WO 2011/098584 A1 and WO 2011/098587 A1 (each DSM IP Assets B.V.) describe the use of a variety of dinuclear manganese complexes with Me$_3$TACN as ligand for paint drying.

WO 2012/092034 A2 (Dura Chemicals, Inc.) describes the use of a transition metal and a porphyrin based ligand as a siccative for resin compositions.

The use of mixtures of metal salts and ligands to enhance drying of paint formulations is known. For example, W H Canty, G K Wheeler and R R Myers (Ind. Eng. Chem., 52:67 (1960)) describe the drying capability of a mixture of 1,10-phenanthroline (phen) and Mn soap, which is similar to that of prepared Mn-phen complexes. Mixtures of 2,2'-bipyridine (bpy) and manganese soaps show a better drying performance than manganese soaps without bpy (see P K Weissenborn and A Motiejauskaite, *Prog. Org. Coat.*, 40:253 (2000)). Also, R van Gorkum et al. (*Inorg. Chem.*, 43:2456 (2004)), describe that the addition of bpy to Mn(acetylacetonate)$_3$ gives an acceleration in the drying performance, and attribute this to the formation of manganese-bipyridine complexes. The use of manganese complexes with acetylacetonate and bidentate nitrogen donor ligands in paint drying has also been described in EP 1382648 A1 (Universiteit Leiden).

In WO 2012/093250 A1 (OMG Additives Limited) it is described that, by contacting an aqueous solution of transition metal ions and polydentate ligands with alkyd-based formulations, the resultant formulation shows reduced skinning tendency as compared with the introduction of metal ions and polydentate ligands in nonaqueous media.

It may be inferred from the recent literature, including patent literature, published in the field of oxidatively curable coating formulations, for example from WO 2008/003652 A1, WO 2011/098583 A1, WO 2011/098584 A1, WO 2011/098587 A1 and WO 2012/092034 A2, that advantageous curing rates of oxidatively curable resins, for example alkyd-based resins, results from the use of metal driers comprising ligands that give rise to relatively stable transition metal-ligand complexes. In general, when using polydentate ligands, i.e. ligands that bind a metal ion through more than one donor site, improved stability of the resultant metal complexes in different redox states can be observed as compared to the corresponding complexes were monodentate ligands are used.

Nevertheless, there remains a need in the art of oxidatively curable formulations for the provision of further curable formulations, which need not comprise cobalt-based driers, but which nevertheless exhibit acceptable rates of curing. Also, there remains a need in the field of oxidatively curable alkyd-based formulations to be able to provide a formulation which, on the one hand, ameliorates the problem of skinning upon storage of such formulations that comprise metal-based driers, and on the other hand requires less modification by the manufacturers of oxidatively curable coating compositions suitable for application than existing oxidatively curable alkyd-based formulations that are essentially absent metal-based driers. The present invention is intended to address these needs.

SUMMARY OF THE INVENTION

We have found that transition metal complexes, for example manganese complexes, comprising bis-triazacyclononane-based ligands, are effective for accelerating curing of oxidatively curable coating formulations.

Viewed from a first aspect, therefore, the invention provides a formulation comprising an oxidatively curable alkyd-based curable resin and a chelant of the formula (I):

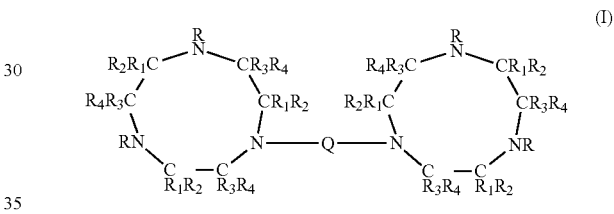

wherein:

each R is independently selected from hydrogen, $C_1$-$C_{24}$alkyl, $CH_2CH_2OH$, $CH_2COOH$ and pyridin-2-ylmethyl;

Q is a $C_2$-$C_6$alkylene bridge, a $C_6$-$C_{10}$ arylene bridge or a bridge comprising one or two $C_1$-$C_3$ alkylene units and one $C_6$-$C_{10}$ arylene unit, which bridge may be optionally substituted one or more times with independently selected $C_1$-$C_{24}$ alkyl groups; and each $R_1$, $R_2$, $R_3$, and $R_4$ is independently selected from hydrogen, $C_1$-$C_4$alkyl and $C_1$-$C_4$alkylhydroxy.

The chelant in the formulation may or may not be part of a complex comprising a suitable transition metal ion.

Viewed from a second aspect, the invention provides a method of preparing a formulation according to the first aspect of the invention, the method comprising contacting a composition comprising an alkyd-based resin with a composition comprising a chelant of formula (I). The chelant in the composition comprising it may or may not be part of a complex comprising a suitable transition metal ion.

Viewed from a third aspect, the invention provides a composition resultant from curing of a formulation of the first aspect of the invention, or from curing of a formulation obtainable according to the second aspect of the invention.

Viewed from a fourth aspect, the invention provides a kit comprising a formulation according to the first aspect of the invention or obtainable according to the second aspect of the invention, which formulation comprises less than 0.001% by weight of ions of each of at least manganese, iron, cobalt, vanadium and copper and, separately, a composition comprising transition metal ions selected from the group consisting of manganese, iron, cobalt, vanadium and copper ions.

Viewed from a fifth aspect, the invention provides a method comprising applying to a substrate a formulation according to the first aspect of the invention, or obtainable according to the second aspect of the invention.

Further aspects and embodiments of the present invention will be evident from the discussion that follows below.

DETAILED DESCRIPTION OF THE INVENTION

As summarized above, the present invention is based, in part, on the recognition that transition metal complexes, for example, of manganese, comprising bis-triazacyclononane-based ligands, or chelants, of formula (I) catalyze faster curing of oxidatively curable alkyd-based resin formulations than would have been expected from the prior art.

The oxidatively curable resin of the formulation is alkyd-based. As noted above, alkyd resins are a well-understood binder class used in film-forming coating compositions. The term coating composition is to be interpreted broadly and embraces, for example, varnishes, primary coats, filling pastes and glazes. Coating compositions may be solvent-based or water based, e.g., emulsions. Typical coating compositions comprise solvent-based air-drying coatings and/or paints for domestic use. According to particular embodiments of the present invention, the formulations of the invention (including the fully formulated oxidatively curable coating compositions described herein) are paints. The formulations of the invention (including the fully formulated oxidatively curable coating compositions described herein) may comprise inks, for example a metal plate ink, lithographic ink, relief printing ink, screen ink or offset overprinting ink.

By oxidatively curable alkyd-based resin formulations is meant herein liquids that form a continuous solid coating as a consequence of the course of oxidative reactions (curing) and, generally, evaporation of a liquid continuous phase (generally solvent).

Typically, curing results in formation of cross-linkages and other bond formations through reactions involving unsaturated components within alkyd-based resin formulations.

In alkyd-based resin formulations, also referred to herein as alkyd-based formulations, the major binder present is an alkyd. By binder is meant in the art and herein the film-forming (curable) component within curable compositions, i.e. the component within the compositions that forms the desired three-dimensional network upon curing.

Typically the curable component of an oxidatively curable composition (e.g., a formulation of the invention) will comprise between about 1 and about 98% by weight, for example between about 1 and about 90% by weight of the total weight of the composition, e.g., between about 20 and about 70% by weight of the total weight of the composition. At least 50% by weight of the oxidatively curable portion (i.e. of the binder) in an oxidatively curable alkyd-based resin, i.e. from about 50% by weight to about 100% by weight, is curable alkyd resin. Typically, at least 75% by weight of the binder in an oxidatively curable alkyd-based resin, i.e. from about 75% by weight to about 100% by weight (e.g., from about 90% by weight to about 100% by weight), is curable alkyd resin. According to particular embodiments, about 100% by weight of the binder in an oxidatively curable alkyd-based resin is curable alkyd resin.

The balance, if any, of the curable (i.e. binder) component may be, for example, curable acrylate, urethane, polybutadiene and epoxy ester resins. The skilled person is aware that introducing quantities of curable binders other than curable alkyds allows the distinct properties of such binders to be introduced to a controllable degree into the ultimate coating resultant from application of a composition, such as an oxidatively curable composition, which may be made from the formulation of the invention.

As described above, oxidatively curable alkyd resins are a well-understood and indeed dominant binder in many oxidatively curable paints (both for commercial and domestic use) and other coating compositions. They are employed, in particular, in solvent-based coating compositions.

Alkyds (used synonymously herein with alkyd resins) are produced by the condensation, typically polycondensation, of polyols with carboxylic acids or anhydrides. To make them susceptible to the so-called drying process, some alkyd resins (i.e. those that are oxidatively curable, present in the formulation of the invention) are reacted with unsaturated triglycerides or other source of unsaturation. Plant and vegetable oils, such as linseed oil, are frequently used as the source of triglycerides. The term oxidatively curable alkyd resin thus generally refers in the art, and herein, to polyesters modified with fatty acids. As is known in the art, alkyd resins are generally prepared via condensation polymerization reactions between three types of monomers: (i) one or more polyalcohols (also known as polyols), (ii) one or more polybasic acids (also known as polyacids); and (iii) long chain unsaturated fatty acids or triglyceride oils, which confer upon the alkyds the susceptibility towards curing.

Owing to its presence in naturally occurring oils, glycerol is a widely used polyol in the preparation of alkyds. Other examples of suitable polyhydric alcohols include: pentaerythritol, dipentaerythritol, ethylene glycol, diethylene glycol, propylene glycol, neopentyl glycol, trimethylol propane, trimethylol ethane, di-trimethylol propane and 1,6-hexane diol.

Polycarboxylic acids and the corresponding anhydrides, used to synthesize alkyds, comprise aromatic, aliphatic and cycloaliphatic components, which are generally derived from petrochemical feedstocks. Typical examples of such polyacids include: phthalic acid and its regioisomeric analogues, trimellitic acid, pyromellitic acid, pimelic acid, adipic acid, azelaic acid, sebacic acid, maleic acid, fumaric acid and tetra-hydrophthalic acid.

Suitable so-called drying and semi-drying fatty acids or mixture thereof, useful herein, are typically ethylenically unsaturated conjugated or non-conjugated $C_2$-$C_{24}$ carboxylic acids, such as oleic, ricinoleic, linoleic, linolenic, licanic acid and eleostearic acids or mixture thereof, typically used in the forms of mixtures of fatty acids derived from natural or synthetic oils.

By semi-drying and drying fatty acids is meant fatty acids that have the same fatty acid composition as the oils (i.e. the esters) from which they are derived. The classification of the oils is based on the iodine number: for a drying oil the iodine number is >140; for a semi-drying oil the iodine number is ranging between 125 and 140, and for a non-drying oil the iodine number is <125 (see "*Surface Coatings*", part 1, Chapman & Hall, London, page 55, 1993).

Typically, oxidatively curable alkyd-based formulations, both generally and according to the first aspect of the invention, are liquids. More typically still, such formulations are solvent-based, that is to say they comprise an organic solvent (which may be a mixture of solvents) for the binder and, in accordance with the first aspect of the invention, the chelant.

In other words, "solvent-based" implies to the skilled person in this context formulations that are based on organic (i.e. non-aqueous) solvents, i.e. comprising an organic solvent as a liquid continuous phase. Examples of suitable solvents include aliphatic (including alicyclic and branched) hydrocarbons, such as hexane, heptane, octane, cyclohexane, cycloheptane and isoparaffins; aromatic hydrocarbons such as toluene and xylene; ketones, e.g., methyl ethyl ketone and methyl isobutyl ketone; alcohols, such as secondary butanol, isopropyl alcohol, n-butyl alcohol and n-propyl alcohol, glycols such as propylene glycol; alcohol ethers and esters, glycol monoethers, such as the monoethers of ethylene glycol and diethylene glycol; monoether glycol acetates, such as 2-ethoxyethyl acetate; N-methylpyrrolidone; as well as mixtures thereof. Isomeric variants are included. Thus, for example, the term hexane embraces mixtures of hexanes. According to particular embodiments of the invention, the solvent is a hydrocarbyl (i.e. hydrocarbon) solvent, e.g., an aliphatic hydrocarbyl solvent, e.g., solvents comprising mixtures of hydrocarbons. Examples include white spirit and solvents available under the trademarks Shellsol, from Shell Chemicals and Solvesso and Exxsol, from Exxon.

Whilst according to many embodiments of the various aspects of the present invention compositions and formulations are solvent-based, water-based alkyd-based resin formulations and coating compositions are also well known and the compositions and formulations described herein may be water-based (i.e. comprise water as a continuous liquid phase). Accordingly, compositions and formulations described herein may be of alkyd-based resin formulations in the form of emulsions, and may thus comprise a suitable emulsifier, as is well known in the art.

When an alkyd-based formulation or composition is referred to herein as "oxidatively curable", it is to be understood that this term is being used to describe a composition susceptible to the reactions that occur between unsaturated groups (e.g., carbon-carbon double bonds) and oxygen from the air, which reactions constitute oxidative curing and are manifested in hardening and formation of solid coatings obtainable from such compositions or formulations. Thus, an oxidatively curable alkyd-based resin formulation is a formulation capable of oxidative curing, but which has not yet been allowed to cure. In contrast, the composition of the third aspect of the invention is directed towards formulations after curing, i.e. when cured. The formation of the desired coating resultant from curing may be accelerated through the use of catalytic drying, for example by transition metal-based driers, in particular transition metal-based driers comprising chelants of formula (I).

A characteristic feature of the various aspects of the present invention is the use of chelants of formula (I). Complexes comprising these chelants and one or more suitable transition metal ions accelerate the curing of the oxidatively curable formulation of the invention, which acceleration is absent in the absence of suitable transition metal ions.

The nature of the chelants of formula (I) will now be described. It will be understood that more than one such chelant may be used in accordance with the various aspects of the invention. Typically, however, only one kind of chelant will be used. The chelant is of formula (I):

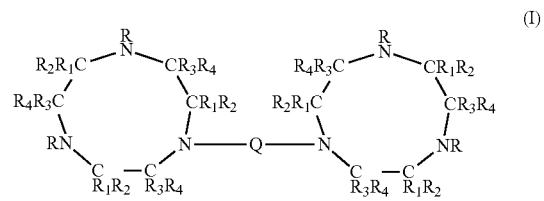

wherein:
each R is independently selected from hydrogen, $C_1$-$C_{24}$alkyl, $CH_2CH_2OH$, $CH_2COOH$ and pyridin-2-ylmethyl;
Q is a $C_2$-$C_6$alkylene bridge, a $C_6$-$C_{10}$ arylene bridge or a bridge comprising one or two $C_1$-$C_3$ alkylene units and one $C_6$-$C_{10}$ arylene unit, which bridge may be optionally substituted one or more times with independently selected $C_1$-$C_{24}$ alkyl groups; and
each $R_1$, $R_2$, $R_3$, and $R_4$ is independently selected from hydrogen, $C_1$-$C_4$alkyl and $C_1$-$C_4$alkylhydroxy.

The chelants of formula (I) are bridged dimers of triazacyclononane-based ligands, in which one nitrogen atom in each of the two triazacyclononane-based ligands is attached to the same (and thus the bridging) linker (Q).

Q may be a $C_2$-$C_6$ alkylene bridge. Such alkylene bridges are typically although not necessarily straight chain alkylene bridges as discussed below. They may, however, be cyclic alkylene groups (e.g., the bridge may be cyclohexylene). Where Q is a $C_6$-$C_{10}$ arylene bridge, this may be, for example, phenylene or the corresponding arylene formed by abstraction of two hydrogen atoms from naphthalene. Where Q comprises one or two $C_1$-$C_3$ alkylene units and one $C_6$-$C_{10}$ arylene unit, such bridges may be, for example, —$CH_2C_6H_4CH_2$— or —$CH_2C_6H_4$—. It will be understood that each of these bridges may be optionally substituted one or more times, for example once, with independently selected $C_1$-$C_{24}$ alkyl (e.g., $C_1$-$C_{18}$ alkyl) groups.

In these chelants of formula (I), Q is typically a $C_2$-$C_6$ alkylene bridge. Where this is so, Q is typically a straight chain alkylene, e.g., is ethylene, n-propylene, n-butylene, n-pentylene or n-hexylene. According to particular embodiments, the $C_2$-$C_6$ alkylene bridge is ethylene or n-propylene. According to still more particular embodiments, the $C_2$-$C_6$ alkylene bridge is ethylene. Hereinafter, references to propylene are intended to refer to n-propylene (i.e. —$CH_2CH_2CH_2$—).

In particular embodiments:
each R is independently selected from: hydrogen, $CH_3$, $C_2H_5$, $CH_2CH_2OH$ and $CH_2COOH$; and/or
Q is selected from ethylene and propylene.

In still more particular embodiments, each R, $R_1$, $R_2$, $R_3$, and $R_4$ is independently selected from H and Me and Q is ethylene.

In yet more particular embodiments, the chelant of formula (I) is 1,2-bis-(4,7-dimethyl-1,4,7,-triazacyclonon-1-yl)-ethane ($Me_4$-DTNE).

The chelant of formula (I) is typically present in formulations according to the present invention in concentrations of from 0.00005 to 0.5% by weight, often from 0.0001 to 0.1% by weight.

Where percentages by weight are referred to herein (wt % or % w/w), these mean, unless a context clearly dictates to the contrary, percentages by weight with respect to the binder component (i.e. the alkyd-based resin and any other binders present). With an oxidatively curable alkyd-based coating formulation, for example, the combined weights of the binders are those with respect to which weight percentages herein are based. For example, where a formulation according to the first aspect of the invention comprises 0.00005% w/w of chelant of formula (I), this is with respect to the weight of the curable components of the composition (i.e. the weight of the binder(s)).

Often, formulations of the first aspect of the invention will comprise a complex of the chelant of formula (I) with a suitable transition metal ion. However, this need not necessarily be so. This is because we have recognized that there is technical advantageousness in providing an oxidatively curable alkyd-based resin formulation comprising a chelant (used interchangeably herein with the term "chelating agent") of formula (I), which formulation is essentially absent at least manganese, iron, cobalt, vanadium and copper ions. These, ions, if present in the formulation, can form together with the chelant a metal drier capable of accelerating oxidative curing.

A manufacturer of an alkyd-based resin formulation suitable for oxidative curing can thus include a chelant of formula (I) in an amount appropriate for a given oxidatively curable alkyd-based resin formulation. Each type of oxidatively curable alkyd-based resin can, and typically does, have different sensitivity towards radical curing and may thus require a particular concentration of a metal drier for optimal curing. However, to determine the appropriate concentration in practice is not straightforward, since a metal drier, for example a manganese-based catalyst, can initiate radical curing before the coating composition (e.g., paint) comprising an oxidatively curable alkyd-based resin formulation (and other components) can be applied, leading to undesirable degradation and/or hardening of the resin formulation. In contrast, a manufacturer of an oxidatively curable alkyd-based resin formulation, as opposed to the manufacture of a fully formulated oxidatively curable coating composition comprising such an oxidatively curable alkyd-based resin formulation, can determine the optimum amount of metal drier for a given alkyd-based resin formulation and add to batches of it a suitable amount of chelant of formula (I) (but not the transition metal ions that allow formation of a catalytically active drier, which are often, but not necessarily, manganese, iron, cobalt, vanadium or copper ions). An appropriate quantity of transition metal ions can then be added to the resultant formulation by, for example, a manufacturer of a fully formulated coating composition, along with other components to make a fully formulated oxidatively curable coating composition.

Mixing of appropriate chelants of formula (I) with alkyd-based resin formulations in the essential absence of at least manganese, iron, cobalt, vanadium and copper ions which, if present, render these chelants catalytically active as metal driers, affords formulations at least less susceptible to skinning or instability without the requirement to add antiskinning agents and/or to take other specific measures to avoid skinning. Such formulations thus constitute particular embodiments of the first aspect of the invention.

Moreover, we have found that mixing of appropriate chelants of formula (I) with alkyd-based resin formulations in the essential absence of at least manganese, iron, cobalt, vanadium and copper ions is advantageous other than because doing so affords formulations at least less susceptible to skinning or instability without the requirement to add antiskinning agents and/or to take other specific measures to avoid skinning. In particular, we have found that, when formulations of the invention are prepared by contacting a chelant of formula (I) with an alkyd-based resin formulation in the essential absence of at least manganese, iron, cobalt, vanadium and copper ions, the resultant formulations, after they have been contacted with a suitable source of transition metal ions (typically selected from the group consisting of manganese, iron, cobalt, vanadium and copper ions, e.g., manganese ions), cure more quickly than similar formulations that are prepared by contacting a composition comprising an alkyd-based resin with a composition comprising a well-defined complex comprising the same chelant of formula (I). Such formulations thus constitute further particular embodiments of the first aspect of the invention.

By well-defined complex is meant herein (as the term is used customarily in the art) a complex that has been isolated such that it is susceptible to characterization (i.e. definition) and analysis (e.g., to determine its structure and degree of purity). In contrast, the complex that is not well-defined is one that is prepared without isolation from the medium (e.g., reaction medium) in which it is prepared. That those formulations according to the first aspect of the invention prepared other than from well-defined complexes cure more quickly is particularly surprising. Such formulations are described in further detail below, in connection with the method of the second aspect of the invention.

The embodiments of the formulation of the first aspect of the invention that are essentially absent at least manganese, iron, cobalt, vanadium and copper ions comprise less than 0.001% by weight of at least ions of each of manganese, iron, cobalt, vanadium and copper. By this is meant that the formulation of the invention is absent 0.001% by weight manganese ions, absent 0.001% by weight iron ions, absent 0.001% by weight cobalt ions, absent 0.001% by weight vanadium ions and absent 0.001% by weight copper ions. An appropriate quantity of suitable transition metal cations (e.g., ions of one or more of manganese, iron, cobalt, vanadium and copper) can be added after preparation of such a formulation, for example when introducing optional additional components to form an oxidatively curable coating composition.

Particular formulations of the invention can if desired comprise less than 0.0001% by weight of each of at least manganese, iron, cobalt, vanadium and copper ions. Still other embodiments of formulations of the invention comprise less than 0.001% by weight of each of manganese, iron, cobalt, vanadium, copper, titanium, molybdenum, tungsten, cerium and zirconium. Still other embodiments of formulations of the invention comprise less than 0.0001% by weight of each of manganese, iron, cobalt, vanadium, copper, titanium, molybdenum, tungsten, cerium and zirconium.

Ideally, embodiments of the formulation of the invention with concentrations of specific transition metal ions of less than 0.001 wt % or 0.0001 wt % are absent any of the transition metal ions specified. Obviously, however, this is in practice impossible to achieve. Accordingly, these formulations are preferably absent of the transition metal ions specified to the greatest extent practicable.

In order to make, in accordance with a method of the second aspect of the invention, a formulation according to the first aspect of the invention, a composition comprising an oxidatively curable alkyd-based resin is contacted with a composition comprising a chelant of formula (I). The composition comprising the chelant of formula (I) that is contacted with the composition comprising the alkyd-based resin may, in some embodiments, comprise a transition metal ion-containing complex comprising the chelant. This may be a well-defined complex or one that is not well-defined. Further, a mixture of well-defined complex and a non-complexed chelant of formula (I) may be employed in the composition comprising the alkyd-based resin. In other embodiments, the composition comprising the chelant of formula (I) is not part of a transition metal ion-containing complex, in which case a source of transition metal ions may, if wished, be added afterwards (or indeed have been formulated together with the alkyd-based resin before addition of the chelant of formula (I)) so as to form a complex comprising the chelant of formula (I) in situ (i.e. within the alkyd-based resin formulation). It will be understood that such a complex may be regarded as not well-defined. Both of these different types of embodiments are described below.

The typical molar ratio between any transition metal ions and the chelant is between about 0.1:1 and about 10:1, often between about 0.3:1 and about 3:1. Often, the molar ratio between chelant and transition metal ions will be approximately between 1:2 and 1:1. However, this need not necessarily be the case. Without being bound to theory, an excess of transition metal ions may be beneficial to allow some adsorption on solid particles without losing too much siccative activity. On the other hand, a stoichiometric excess of chelant may be beneficial to improve regeneration of catalytically active species during curing, which can lead to improved drying (i.e. curing) performance despite using a lower quantity of transition metal ions. Using a stoichiometric excess of chelant can also be advantageous by reducing the intensity of colored metal complexes. The skilled person will be able to take into account these considerations when preparing oxidatively curable coating compositions, for example formulations of the invention.

The contacting of the method of the first aspect of the invention may be during formulation of fully formulated oxidatively curable alkyd-based resin coating compositions (described below), particularly if it is part of a complex comprising a suitable transition metal ion.

If the chelant of formula (I) introduced as a transition metal ion-containing complex, the complex may, for example, be either a well-defined complex or prepared, for example, by contacting a chelant of formula (I) with a suitable transition metal salt in a suitable solvent, by which is meant that either or both of the chelant and transition metal salt may be in a suitable solvent prior to contact with each other. The salt can be a soap. The resultant complexes-containing mixture may then be contacted with a composition comprising an oxidatively curable alkyd-based resin, which is typically dissolved in an organic solvent described above when describing solvent-based alkyd-based formulations (or emulsified in a water-based formulation) such as those described above when describing water-based alkyd-based formulations.

It will be understood from the discussion above concerning the formulations of the first aspect of the invention that, where a complex that is not well-defined is contacted with a composition comprising an alkyd-based resin, in accordance with the method of the second aspect of the invention, such embodiments are noteworthy in relation to both the first and second aspect of the invention. According to such embodiments, there is provided a formulation according to the first aspect of the invention that is obtainable by carrying out a method of the second aspect of the invention in which the chelant is not part of a well-defined complex comprising a suitable transition metal ion (e.g., an ion selected from the group consisting of ions of manganese, iron, cobalt, vanadium and copper, e.g., a manganese ion). Alternatively, such formulations may be regarded as being obtainable by a method of the second aspect of the invention, the method further comprising providing the chelant of formula (I) as a complex that is obtained, or obtainable, by contacting a chelant of formula (I) with a suitable transition metal salt (which may be a soap) in a suitable solvent. Typically, the resultant mixture is contacted, as is (i.e. without further manipulation, including purification), with the composition comprising the alkyd-based resin. In other words, particular embodiments of the second aspect of the invention comprise contacting the composition comprising the alkyd-based resin with a mixture of a chelant of formula (I) and a suitable transition metal ion-containing salt, typically of a manganese, iron, vanadium, cobalt or copper ion.

Often, the metal salt used will be a manganese salt, typically of a divalent or trivalent redox state. Upon contacting the manganese (or other transition metal) salt with the chelant, formation of manganese-chelant complexes (or other transition metal-chelant complexes) takes place.

The transition metal salt used can be a solid, a suspension, or as a solution in a variety of solvents. Typically the salt comprises a manganese (II) or manganese (III) ion although other salts, e.g., manganese (IV) salts may also be used. Such manganese (or other metal ion) salts can be added as solids, suspensions, or as solutions in a variety of solvents. The invention contemplates use of a mixture of metal salts although a single salt is typically used.

Adding the chelant as a solution can be advantageous in permitting improved and/or easier mixing with the (solution of) binder(s). It may be beneficial to dilute chelant in a suitable solvent before adding to the binder if it is wished to introduce a very small amount of chelant, so greater accuracy of dosing can be achieved. Depending on the properties of the chelant and the desired resin-chelant formulation, suitable solvents include aliphatic hydrocarbons, such as heptanes, water, alcohols, such as ethanol or propylene glycol, or mixtures thereof. The skilled person will be able to easily formulate such solutions, generally using solvent such as those described above.

It will be understood that there is no particular limitation as to the source of the transition metal ions. Typically, however, salts are selected from the group consisting of optionally hydrated $MnCl_2$, $FeCl_2$, $FeCl_3$, $MnBr_2$, $Mn(NO_3)_2$, $Fe(NO_3)_3$, $MnSO_4$, $FeSO_4$, $(Fe)_2(SO_4)_3$, $Mn(acetylacetonate)_2$, $Fe(acetylacetonate)_2$, $Mn(acetylacetonate)_3$ $Fe(acetylacetonate)_3$, $Mn(R_5COO)_3$ (including $Mn(acetate)_3$), $Fe(R_5COO)_3$, $Mn(R_5COO)_2$ and $Fe(R_5COO)_2$, wherein $R_5$ is selected from a $C_1$-$C_{24}$ alkyl. According to particular embodiments, the above-mentioned salts are based on manganese. Where the salt comprises two $R_5$ groups, these can be the same or different. The alkyl moieties, by which is meant saturated hydrocarbyl radicals, may be straight-chain or comprise branched and/or cyclic portions. Indeed, throughout the specification, where reference is made to alkyl, unless the context dictates to the contrary, this means a $C_{1-24}$alkyl, which may be straight-chain or branched and may be cycloalkyl or comprise a cyclic portion (e.g., alkyl may be cyclohexylmethyl), for example $C_{1-10}$alkyl or $C_{1-6}$alkyl, e.g., methyl.

Often, the manganese salt is selected from $Mn(R_5COO)_2$, particularly with $R_5COO(^-)$ being selected from acetate, octanoate, 2-ethylhexanoate, neodecanoate (3,3,5,5-tetramethylhexanoate), and naphthenate. Particularly often, a manganese salt is used, which, for example is selected from manganese(octanoate)$_2$, manganese(naphthenate)$_2$, manganese(2-ethylhexanoate)$_2$ and manganese (neodecanoate)$_2$. The invention also contemplates use of a mixture of different redox states of the manganese ions with the same counter-ion, for example a mixture of manganese(2-ethylhexanoate)$_2$ and manganese(2-ethylhexanoate)$_3$.

The term optionally hydrated is well known in the art. Metal salts often contain water molecules within a crystal lattice, which will remain present unless the hydrated metals salts are subjected to specific drying steps by heating or drying under reduced pressure. However, partially or fully dehydrated metal salts can also be used. For example, manganese (II) acetate, and manganese (II) chloride can be bought as tetrahydrate salts or as dehydrated salts. Commercial manganese sulfate is available in both tetrahydrate and monohydrate forms.

Often these transition metal salts are commercially available as solutions, particularly if they are of the formulae $Mn(R_5COO)_2$ described above, for example in hydrocarbon solutions to facilitate dissolution in the solvent-based curable compositions such as paint formulations. However, other solvents may also be used, including alcohols and water (or aqueous solutions), especially for chloride, sulfate and acetate salts of manganese and iron ions.

Formulations of the invention that comprise less than 0.001% (or 0.0001%) by weight of ions of each of at least manganese, iron, cobalt, vanadium and copper may be prepared by contacting chelant of formula (I) with (e.g., adding it to) an oxidatively curable alkyd-based binder, typically dissolved in an organic solvent described above (or emulsified in a water-based liquid), as described above. The chelant may be added as a pure material to the resin(s), or as a solution. Adding the chelant as a solution can be advantageous in permitting improved and/or easier mixing with the (solution of) binder(s). It may be beneficial to dilute chelant in a suitable solvent before adding to the binder if it is wished to introduce a very small amount of chelant, so greater accuracy of dosing can be achieved. Depending on the properties of the chelant and the desired resin-chelant formulation, suitable solvents include aliphatic hydrocarbons, such as heptanes, water, alcohols, such as ethanol or propylene glycol, or mixtures thereof. The skilled person will be able to easily formulate such solutions, generally using a solvent such as those described above.

It will be understood from the discussion above concerning the formulations of the invention that, where formulations are prepared in this way, such embodiments are noteworthy in relation to both the first and the second aspect of the invention.

Thus, as described herein, formulations of the invention comprising transition metal ion-containing complexes of the chelant of formula (I) can be prepared, either by contacting an alkyd-based resin composition with such a complex directly, or by contacting an alkyd-based resin composition with chelant that is not part of such a complex and then adding to the resultant formulation a source of transition metal ions. As a still further embodiment of the method of the second aspect of the invention, an alkyd-based resin composition comprising suitable transition metal ions may be contacted with the chelant of formula (I). Generally, formulations of the invention comprising transition metal ions comprise a concentration of between about 0.0003 wt % and about 0.07 wt %, for example about 0.0005 wt % and about 0.05 wt %, e.g., between about 0.005 wt % and about 0.05 wt %, of the suitable transition metal ion, such as those described immediately below.

Transition metal ions to which the chelants of formula (I) may coordinate, to provide metal driers (transition metal ion-containing complexes that can accelerate curing of the oxidatively curable alkyd-based resin in the formulation of the invention) may be, for example manganese, iron, cobalt, vanadium and copper ions, still more typically manganese ions, or mixtures of any these metal ions. The valency of the metal ions may range from +1 to +6, often from +2 to +5. Examples include metal ions selected from the group consisting of Mn(II), Mn(III), Mn(IV), Mn(V), Cu(I), Cu(II), Cu(III), Fe(II), Fe(III), Fe(IV), Fe(V), Co(I), Co(II), Co(II), V(II), V(III), V(IV), and V(V), for example metal ions selected from the group consisting of Mn(II), Mn(III), and Mn(IV).

In complexes comprising the chelant of formula (I), the number of metal ions per chelant molecule may be either 1 or 2. Since a chelant of formula (I) contains two cyclic nitrogen donor moieties, each of these rings may bind to one metal ion. Thus one may obtain a molar ratio of the chelant of formula (I) to metal ion of 1:2. Also one may obtain complexes or species whereby one chelant of formula (I) binds to only one metal ion, for example if a molar excess of chelant of formula (I) is employed. In this way, there is provided a molar ratio of the chelant of formula (I) to metal ion of 1:1.

Complexes comprising the chelant of formula (I) may, for example, be of the generic formula (II):

$$[M_aL_kX_n]Y_m \qquad (II)$$

in which:
  M represents a metal ion selected from Mn(II), Mn(III), Mn(IV), Mn(V), Cu(I), Cu(II), Cu(III), Fe(II), Fe(III), Fe(IV), Fe(V), Co(I), Co(II), and Co(III);
  each X independently represents a coordinating species selected from any mono-, bi-, or tri-charged anions and any neutral molecule able to coordinate a metal ion M in a mono-, bi- or tridentate manner;
  each Y is independently a non-coordinating counter-ion;
  a represents an integer from 1 to 10;
  k represents an integer from 1 to 10;
  n represents an integer from 1 to 10;
  m represents an integer from 1 to 20; and
  L represents a chelant of formula (I),
  or a hydrate thereof.

According to particular embodiments of formula (II), alone or in combination:
  M represents a metal ion selected from Mn(II), Mn(III), and Mn(IV);
  X represents a coordinating species selected from $O^{2-}$, $[R^6BO_2]^{2-}$, $R^6COO^-$, $[R^6CONR^6]^-$, $OH^-$, $NO_3^-$, $NO$, $S^{2-}$, $R^6S^-$, $PO_4^{3-}$, $HPO_4^{2-}$, $H_2PO_4^-$, $[PO_3OR^6]^{3-}$, $H_2O$, $CO_3^{2-}$, $HCO_3^-$, $R^6OH$, $NR^6R^7R^8$, $R^6OO^-$, $O_2^{2-}$, $O_2^-$, $R^6CN$, $Cl^-$, $Br^-$, $I^-$, $OCN^-$, $SCN^-$, $CN^-$, $N_3^-$, $F^-$, $RO^-$, $ClO_4^-$, $CF_3SO_3^-$;
  Y represents a counter-ion selected from $ClO_4^-$, $CF_3SO_3^-$, $[B(R^6)_4]^-$, $[FeCl_4]^-$, $PF_6^-$, $R^6COO^-$, $NO_3^-$, $RO^-$, $N^+R^6R^7R^8R^9$, $Cl^-$, $Br^-$, $I^-$, $F^-$, $S_2O_6^{2-}$, $OCN^-$, $SCN^-$, $H_2O$, $BF_4^-$, $SO_4^{2-}$;
  $R^6$, $R^7$, $R^8$ and $R^9$ each independently represents hydrogen, optionally substituted alkyl or optionally substituted aryl;
  a represents an integer from 1 to 4;
  k represents an integer from 1 to 10;
  n represents an integer from 1 to 4; and
  m represents an integer from 1 to 8.

By aryl in formula (II) is meant herein a $C_{6-14}$aryl (e.g., phenyl or napthyl) and by alkyl is meant a $C_{1-24}$alkyl.

Where an alkyl or aryl group is optionally substituted, this may be with one or more substituents independently selected from the group consisting of -halo, —OH, —OR$^{10}$, —NH$_2$, —NHR$^{10}$, —N(R$^{10}$)$_2$, —N(R$^{10}$)$_3^+$, —C(O)R$^{10}$, —OC(O) R$^{10}$, —CO$_2$H, —CO$_2^-$, —CO$_2$R$^{10}$, —C(O)NH$_2$, —C(O) NHR$^{10}$, —C(O)N(R$^{10}$)$_2$, -heteroryl, —R$^{10}$, —SR$^{10}$, —SH, —P(R$^{10}$)$_2$, —P(O)(R$^{10}$)$_2$, —P(O)(OH)$_2$, —P(O)(OR$^{10}$)$_2$, —$NO_2$, —$SO_3H$, —$SO_3^-$, —$S(O)_2R^{10}$, —$NHC(O)R^{10}$ and —$N(R^{10})C(O)R^{10}$, wherein each $R^{10}$ is independently selected from alkyl, aryl, aralkyl optionally substituted one or two more times with a substituent selected from the group consisting of -halo, —$NH_3^+$, —$SO_3H$, —$SO_3^-$, —$CO_2H$, —$CO_2^-$, —$P(O)(OH)_2$, —$P(O)(O^-)_2$.

According to particular embodiments, a=2 and k=1.

As is known, the ability of metal driers to catalyze the curing of oxidatively curable coating compositions arises from their ability to participate in redox chemistry: the nature of the counter-ion(s) Y is not of great importance. The choice of these may be the affected by the solubility of the complex of metal ions and chelant of formula (I) in a given formulation or composition. For example, counter-ion(s) Y such as chloride, sulfate or acetate may serve to provide a readily water-soluble complex, if a water-based paint is desired. When using solvent-based (i.e. non-aqueous) compositions, it may be desirable to use larger, less popular counter-ions such as 2-ethylhexanoate. Suitable counter-ion(s) Y (and coordinating species X) may be selected without difficulty by the skilled person.

According to particular embodiments, X and Y may be independently selected from the group consisting of bromide, iodide, nitrate, sulfate, methoxide, ethoxide, formate, acetate, propionate, 2-ethylhexanoate, oxide, and hydroxide.

An example of a neutral molecule able to coordinate the metal in a mono-, bi- or tridentate manner is acetonitrile, for example, to afford a complex of the formula $ML(CH_3CN)_3]Cl_2$.

It will be understood that counter-ions Y serve to balance the charge resultant from the complex formed by the metal ion(s) M, coordinating species X and chelant(s) L. Thus, if the charge on the complex is positive, there will be one or more anions Y. Conversely, there will be one or more cations Y if the charge on the complex is negative.

It will be understood from the foregoing discussion that complexes of formula (II) embrace dinuclear complexes (i.e. comprising two metal ions M), such as those containing hydroxide, oxo, carboxylate or halide as bridging ligands (with a bridging ligand indicated with μ). Depending on the denticity of the chelant L (i.e. the number of atoms through which it chelates), one or more bridging molecules may be present. A combination of bridging and non-bridging ligands X may be present. Non-limiting examples of dinuclear complexes include $[LMn(\mu-O)(\mu-RCOO)_2Mn](RCOO)_2$ or $[LMn(\mu-O)_2(\mu-RCOO)Mn](RCOO)_2$ (wherein RCOO=methyl (acetate) or 2-ethylhexanoate with L being the chelant according to formula (I), and Mn in its III or IV oxidation state). The metal-ligand complex, containing suitable counter-ion(s) Y, can be contacted with (e.g., added to) an alkyd-based resin so as to form a formulation of the present invention. However, it will be understood from the discussion above that many embodiments of the invention comprise mixing the chelant according to formula (I) with a manganese salt rather than introduction of the chelant in the form of a preformed, well-defined complex such as those described above.

A formulation of the invention can, and generally will, be used in the manufacture of a fully formulated oxidatively curable coating composition. By the term "fully formulated oxidatively curable coating composition" is implied, as is known to those of skill in the art, oxidatively curable formulations that comprise additional components over and above the binder (the oxidatively curable material, which is predominantly oxidatively curable alkyd resin according to the present invention), an aqueous or non-aqueous solvent/liquid continuous phase and any metal driers intended to accelerate the curing process. Such additional components are generally included so as to confer desirable properties upon the coating composition, such as color or other visual characteristics such as glossiness or mattness), physical, chemical and even biological stability (enhanced biological stability being conferred upon coating compositions by the use of biocides for example), or modified texture, plasticity, adhesion and viscosity.

For example, such optional additional components may be selected from solvents, antioxidants (sometimes referred to as antiskinning agents), additional siccatives (i.e. not comprising chelants of formula (I)), auxiliary driers, colorants (including inks and colored pigments), fillers, plasticizers, viscosity modifiers, UV light absorbers, stabilizers, antistatic agents, flame retardants, lubricants, emulsifiers (in particular where an oxidatively curable coating composition or formulation of the invention is aqueous-based), anti-foaming agents, viscosity modifiers, antifouling agents, biocides (e.g., bactericides, fungicides, algaecides and insecticides), anticorrosion agents, antireflective agents, antifreezing agents, waxes and thickeners. Typically, formulations prepared in accordance with embodiments of the method of the second aspect of the invention will comprise at least an organic solvent, selected from the list of solvents described above and a filler, and generally an antiskinning agent, in addition to the alkyd and optionally other binders and chelant present in the formulation of the invention. The skilled person is familiar with the incorporation of these and other components into oxidatively curable coating composition so as to optimize such compositions' properties.

It will be appreciated that some of these optional additional components possess more than one functional property. For example, some fillers may also function as colorants. The nature of any additional components and the amounts used may be determined in accordance with the knowledge of those of skill in the art and will depend on the application for which the curable coating compositions intended. Examples are provided below but these are intended to be illustrative, not limitative.

When producing a fully formulated oxidatively curable coating composition that is, for example, a paint, one or more antioxidants (customarily referred to in the art as antiskinning agents) are often included to avoid premature curing of the oxidatively curable coating composition prior to its use. Such premature curing may be manifested by, for example, the formation of a skin on or lumpy matter in the oxidatively curable coating composition as a result of curing during storage, for example hardening of the surface of a paint layer in a can, owing to the activity of the siccative with oxygen on the oxidatively curable binder. Antiskinning agents are understood to reduce skinning by quenching radicals formed and/or by inactivation of drier catalysts by binding to one or more of the coordination sites. Examples include, but are not limited to, methylethylketoxime, acetonoxime, butyraldoxime, methyl-isobutylketoxime, 2-cyclohexylphenol, 4-cyclohexylphenol, t-butyl-hydroquinone, dialkylhydroxylamine, acetylacetonate, ammonia, vitamin E (tocopherol), hydroxylamine, triethylamine, dimethylethanolamine, 2-t-butyl-4-methylphenol, and 2-[(1-methylpropyl)amino]ethanol. According to particular embodiments, the antiskinning agent is selected from the group consisting of methylethylketone-oxime, acetonoxime, butyraldoxime, dialkylhydroxylamine, ammonia, hydroxylamine, triethylamine, dimethylethanolamine, o-cyclohexylphenol, p-cyclohexylphenol and 2-t-butyl-4-methylphenol.

The quantity of antiskinning agent present in an oxidatively curable coating composition is typically between about 0.001 and about 2.5 wt %. The antioxidant or antiskinning agent may be added to an alkyd-based resin formulation, e.g., of the invention, together with (or separately from) the chelant prior to or during the preparation of a fully formulated oxidatively curable coating composition (for example a paint or other coating composition).

Colorants include pigments and inks. Titanium dioxide is a pigment commonly included in many coating compositions, in particular paints.

Fillers may be added to an oxidatively curable coating composition for a number of reasons, for example to bulk out the coating composition and to compare particular properties on the cured composition. Typically, fillers will be inorganic solids that are generally introduced in particulate (finely divided) form. Examples include silica, silicates or clays (for example mica, talc, kaolin), carbonate or other minerals and metal salts or oxides (such as marble, quartzite). Other suitable fillers will be evident to the skilled person.

It may be advantageous if an alkyd resin manufacturer has determined a particular concentration of metal drier that is appropriate for a particular alkyd-based resin formulation for the manufacturer to recommend to users of the formulation an appropriate source of transition metal ions that may be added in order to generate a desired metal drier in situ.

Moreover, according to the fourth aspect of the invention, there is provided a kit comprising a formulation of the invention comprising less than 0.001% by weight of ions of each of at least manganese, iron, cobalt, vanadium and copper and, separately, a composition comprising a source of suitable transition metal ions, typically ions selected from the group consisting of manganese, iron, cobalt, vanadium and copper ions, more typically manganese ions, often in the form of a salt such as those described above, for admixture to a formulation of the invention. The kit may optionally comprise instructions or other guidance as to methods according to which the formulation and the transition metal ions may be contacted. In this way, the manufacture of a formulation of the invention can, after optimizing the nature of the source of transition metal ions, for example by the preparation of a particular solution of a particular transition metal ions salt, optimize the manner in which formulations containing transition metal complexes can be prepared. The preparation of an oxidatively curable alkyd-based coating composition may be by the manufacturer of such compositions (e.g., a paint manufacturer) or by an end consumer of oxidatively curable alkyd-based coating compositions, who can contact a source of transition metal ions with an otherwise fully formulated oxidatively curable alkyd-based coating composition, It is also within the scope of the current invention that a paint manufacturer, for example, would add commercial metal-soap/chelant mixtures, such as the non-limiting example of Borchers® Dry 0410 (a mixture of bpy with Mn(neodecanoate)$_2$ commercially available from OMG), as a mixture of bpy with Mn(neodecanoate)$_2$. The additional chelant present in the alkyd resin will improve the drying behavior without causing excessive yellowing which may be occurring if more of the Mn-soap/ligand mixture is added to the paint formulation.

Additionally, one or more auxiliary driers may be added to the fully formulated oxidatively curable coating composition. Such auxiliary driers may be optional additional components within, but are often not present in, the formulation of the invention. Such auxiliary driers include fatty acid soaps of zirconium, bismuth, barium, cerium, calcium, lithium, strontium, and zinc. Typically, fatty acid soaps are optionally substituted octanoates, hexanoates and naphthenates. Without being bound by theory, auxiliary driers (sometimes referred to as through driers) are generally understood to diminish the effect of adsorption of the main drier on solid particles often present in an oxidatively curable coating composition. Other non-metal based auxiliary driers may also be present if desired. These may include, for example, thiol compounds, as described in US 2001/0008932 A1 (Bakkeren et al.) or biomolecules as described in US 2005/0245639 A1 (Oostveen et al.). Concentrations of auxiliary driers within oxidatively curable coating compositions (or formulations of the invention) are typically between about 0.01 wt % and 2.5 wt % as is known in the art.

The formulations of the invention (including the fully formulated oxidatively curable coating compositions described herein) may be used as a decorative coating, e.g., applied to wood substrates, such as door or window frames, or for other substrates such as those made of synthetic materials (such as plastics including elastomeric materials), concrete, leather, textile, glass, ceramic or metal, in accordance with the fifth aspect of the invention. The thus-applied composition may then be allowed to cure. In this respect, the third aspect of the invention is directed towards a formulation according to the first aspect, or obtainable according to the second aspect, when cured.

Each and every patent and non-patent reference referred to herein is hereby incorporated by reference in its entirety, as if the entire contents of each reference were set forth herein in its entirety.

The invention may be further understood with reference to the following non-nonlimiting clauses:

1. A formulation comprising an oxidatively curable alkyd-based curable resin and a chelant of the formula (I):

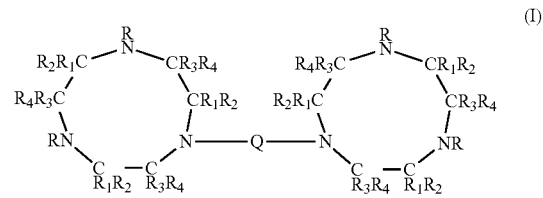

wherein:

each R is independently selected from hydrogen, $C_1$-$C_{24}$alkyl, $CH_2CH_2OH$, $CH_2COOH$ and pyridin-2-ylmethyl;

Q is a $C_2$-$C_6$alkylene bridge, a $C_6$-$C_{10}$ arylene bridge or a bridge comprising one or two $C_1$-$C_3$ alkylene units and one $C_6$-$C_{10}$ arylene unit, which bridge may be optionally substituted one or more times with independently selected $C_1$-$C_{24}$ alkyl groups; and each $R_1$, $R_2$, $R_3$, and $R_4$ is independently selected from H, $C_1$-$C_4$alkyl and $C_1$-$C_4$alkylhydroxy.

2. The formulation of clause 1, wherein each R is independently selected from hydrogen, $CH_3$, $C_2H_5$, $CH_2CH_2OH$ and $CH_2COOH$ and Q is selected from ethylene and n-propylene.

3. The formulation of clause 2, wherein each of R, $R_1$, $R_2$, $R_3$, and $R_4$ is independently selected from hydrogen and methyl and Q is ethylene.

4. The formulation of clause 1, wherein the chelant is 1,2-bis-(4,7-dimethyl-1,4,7,-triazacyclonon-1-yl)-ethane.

5. The formulation of any one of clauses 1 to 4, wherein the chelant is present in the formulation at a concentration of between about 0.00005 and about 0.5 wt % with respect to curable resin.

6. The formulation of any one of clauses 1 to 4, wherein the chelant is present in the formulation at a concentration of between about 0.001 and about 0.1 wt % with respect to curable resin.

7. The formulation of any one of clauses 1 to 6, which is a solvent-based formulation.

8. The formulation of any one of clauses 1 to 7, further comprising an antiskinning agent.

9. The formulation of clause 8, wherein the antiskinning agent is selected from the group consisting of methylethylketone-oxime, acetonoxime, butyraldoxime, dialkylhydroxylamine, ammonia, hydroxylamine, triethylamine, dimethylethanolamine, o-cyclohexylphenol, p-cyclohexylphenol and 2-t-butyl-4-methylphenol.

10. The formulation of any one of clauses 1 to 9, which comprises a complex comprising the chelant and a transition metal ion selected from the group consisting of ions of manganese, iron, cobalt, vanadium and copper.

11. The formulation of clause 10, wherein the complex comprises a manganese ion.

12. The formulation of clause 10 or clause 11, wherein the complex is not well-defined.

13. The formulation of any one of clauses 1 to 9, which formulation comprises less than 0.001% by weight of ions of each of manganese, iron, cobalt, vanadium and copper.

14. A method of preparing a formulation as defined in any one of clauses 1 to 13, the method comprising contacting a composition comprising an alkyd-based resin with a composition comprising a chelant of formula (I).

15. The method of clause 14 wherein the formulation is as defined in clause 13.

16. The method of clause 15 further comprising contacting the formulation with a source of transition metal ions.

17. The method of clause 16, wherein the transition metal ions are manganese, iron, cobalt, vanadium or copper ions.

18. The method of clause 16, wherein the transition metal ions are manganese ions.

19. The method of clause 17 or clause 18 wherein a solution of transition metal ions is contacted with the formulation.

20. The method of any one of clauses 16 to 19, wherein the formulation is contacted with an optionally hydrated salt selected from the group consisting of $MnCl_2$, $FeCl_2$, $FeCl_3$, $MnBr_2$, $Mn(NO_3)_2$, $Fe(NO_3)_3$, $MnSO_4$, $FeSO_4$, $(Fe)_2(SO_4)_3$, $Mn(acetylacetonate)_2$, $Fe(acetylacetonate)_2$, $Mn(acetylacetonate)_3$, $Fe(acetylacetonate)_3$, $Mn(R_5COO)_3$, $Fe(R_5COO)_3$, $Mn(R_5COO)_2$ and $Fe(R_5COO)_2$, wherein each $R_5$ is independently a $C_1$-$C_{24}$ alkyl.

21. The method of clause 20, wherein the formulation is contacted with an optionally hydrated salt selected from the group consisting of $MnSO_4$, $MnCl_2$, $MnBr_2$, $Mn(NO_3)_2$, $Mn(CH_3COO)_3$, $Mn(CH_3COO)_2$, $Mn(acetylacetonate)_2$, $Mn(acetylacetonate)_3$, $Mn(octanonate)_2$, $Mn(2$-ethylhexanoate$)_2$, $Mn(naphthenate)_2$ and $Mn(neodecanoate)_2$.

22. The method of clause 14, wherein the composition comprising the chelant of formula (I) comprises a complex as defined in clause 12.

23. The method of clause 22, wherein the composition comprising the complex comprises a mixture of the chelant of formula (I) and a salt of the transition metal ion.

24. The method of clause 23, wherein the salt is as defined in clause 20 or clause 21.

25. The formulation of any one of clauses 1 to 13, which is obtainable by a method as defined in any one of clauses 16 to 24.

26. A composition resultant from curing of a formulation as defined in any one of clauses 10 to 12 and 25.

27. A kit comprising a formulation as defined in clause 13 and, separately, a composition comprising transition metal ions selected from the group consisting of manganese, iron, cobalt, vanadium and copper ions.

28. The kit of clause 27, wherein the transition metal ions are manganese ions.

29. The kit of clause 28, wherein the ions are provided as a salt as defined in clause 20 or clause 21.

30. A method comprising applying to a substrate a formulation as defined in any one of clauses 10 to 12 and 25.

The non-limiting examples below more fully illustrate the embodiments of this invention.

EXAMPLES

The ligand 1,2-bis-(4,7,-dimethyl-1,4,7,-triazacyclonon-1-yl)-ethane ($Me_4$-DTNE) (purity level of 92.4% w/w) was obtained as disclosed in WO 2012/003712 (Unilever PLC et al.). $[Mn_2(p$-$O)_2(p$-$CH_3COO)(Me_4$-$DTNE)]Cl_2$ (purity level of 87% w/w) was obtained as disclosed in WO 2011/106906 Unilever PLC et al.) Alkyd resin (catalogue number A/1552/15; an alkyd resin solution of 70 wt % in white spirits) was obtained from Acros Organics. Manganese (11) 2-ethylhexanoate (abbreviated as $Mn(2$-$EH)_2$ below; catalogue number 93-2532; 40% solution in mineral spirits, 6 wt % Mn) was obtained from Strem Chemicals. Manganese(II) acetate tetrahydrate and Manganese(III) acetate dihydrate were obtained from Aldrich. Manganese chloride tetrahydrate was obtained from Fluka.

Experiment 1a

To 5 g of alkyd resin was added 16.8 mg $Me_4$-DTNE dissolved in 0.10 mL ethanol. This mixture was stirred manually for ca. 1 minute and was stored in a closed vial overnight at room temperature. Then, 41.67 mg of $Mn(2$-$EH)_2$ was added and the mixture was stirred manually for ca. 1 minute. This led to a Mn level of 0.05 wt % with respect to resin solution (or 0.07 wt % with respect to solid resin) and a 1:1 molar ratio $Mn:Me_4$-DTNE. The next day, 150 mg of this mixture was spread evenly on 10 $cm^2$ of a glass plate. Dryness of the film was determined every 30 minutes by running a needle through the film. 'Dry' was defined when the needle could no longer run through the film, but gave wrinkling of the film's surface. A drying time of 1.2 h was measured.

Experiment 1b

Experiment 1a was repeated, except that manganese(II) acetate tetrahydrate was used instead of $Mn(2$-$EH)_2$: 11.2 mg of manganese(II) acetate tetrahydrate dissolved in 0.3 mL ethanol was added to the resin. A drying time of 1.2 h was measured.

Experiment 1c

Experiment 1a was repeated, except that manganese(III) acetate dihydrate was used instead of $Mn(2$-$EH)_2$; 12.2 mg of manganese(III) acetate dihydrate dissolved in 0.3 mL ethanol was added to the resin. A drying time of 1.1 h was measured.

Experiment 1d

Experiment 1a was repeated, except that manganese chloride tetrahydrate was used instead of Mn(2-EH)$_2$; 9.0 mg of manganese(II) chloride tetrahydrate dissolved in 0.3 mL ethanol was then added to the resin. A drying time of 1.1 h was measured.

Experiment 2

To 5 g of alkyd resin was added 8.4 mg Me$_4$-DTNE dissolved in 0.10 mL ethanol. This mixture was stirred manually for ca. 1 minute and was stored in a closed vial overnight at room temperature. Then, 41.67 mg of Mn(2-EH)$_2$ was added and the mixture was stirred manually for ca. 1 minute. This led to a Mn level of 0.05 wt % with respect to resin solution (or 0.07 wt % with respect to solid resin) and a 2:1 molar ratio Mn:Me$_4$-DTNE. The next day, 150 mg of this mixture was spread evenly on 10 cm$^2$ of a glass plate. Dryness of the film was determined every 30 minutes by running a needle through the film. 'Dry' was defined when the needle could no longer run through the film, but gave wrinkling of the film's surface. A drying time of 1.9 h was measured.

Experiment 3a

To 5 g of alkyd resin was added 3.4 mg Me$_4$-DTNE dissolved in 0.04 mL ethanol. This mixture was stirred manually for ca. 1 minute and was stored in a closed vial overnight at room temperature. Then, 8.3 mg of Mn(2-EH)$_2$ was added and the mixture was stirred manually for ca. 1 minute. This led to a Mn level of 0.01 wt % with respect to resin solution (or 0.014 wt % with respect to solid resin) and a 1:1 molar ratio Mn:Me$_4$-DTNE. The next day, 150 mg of this mixture was spread evenly on 10 cm$^2$ of a glass plate. Dryness of the film was determined every 30 minutes by running a needle through the film. 'Dry' was defined when the needle could no longer run through the film, but gave wrinkling of the film's surface. A drying time of 3.0 h was measured.

Experiment 3b

Experiment 3a was repeated, except that manganese(II) acetate tetrahydrate was used instead of Mn(2-EH)$_2$: 2.23 mg of manganese(II) acetate tetrahydrate dissolved in 0.3 mL ethanol was added to the resin. A drying time of 2.8 h was measured.

Experiment 3c

Experiment 3a was repeated, except that manganese(III) acetate dihydrate was used instead of Mn(2-EH)$_2$; 2.44 mg of manganese(III) acetate dihydrate dissolved in 0.3 mL ethanol was added to the resin. A drying time of 2.7 h was measured.

Experiment 3d

Experiment 3a was repeated, except that manganese chloride tetrahydrate was used instead of Mn(2-EH)$_2$; 1.80 mg of manganese(II) chloride tetrahydrate dissolved in 0.3 mL ethanol was then added to the resin. A drying time of 3.0 h was measured.

Experiment 4

To 5 g of alkyd resin was added 1.7 mg Me$_4$-DTNE dissolved in 0.02 mL ethanol. This mixture was stirred manually for ca. 1 minute and was stored in a closed vial overnight at room temperature. Then, 8.3 mg of Mn(2-EH)$_2$ was added and the mixture was stirred manually for ca. 1 minute. This led to a Mn level of 0.01 wt % with respect to resin solution (or 0.014 wt % with respect to solid resin) and a 2:1 molar ratio Mn:Me$_4$-DTNE. The next day, 150 mg of this mixture was spread evenly on 10 cm$^2$ of a glass plate. Dryness of the film was determined every 30 minutes by running a needle through the film. 'Dry' was defined when the needle could no longer run through the film, but gave wrinkling of the film's surface. A drying time of 3.7 h was measured.

Experiment 5

To 5 g of alkyd resin was added 16.0 mg [Mn$_2$($\mu$-O)$_2$($\mu$-CH$_3$COO)(Me$_4$-DTNE)]Cl$_2$ dissolved in 0.2 mL ethanol. This led to a Mn level of 0.05 wt % with respect to resin solution (or 0.07 wt % with respect to solid resin). This mixture was stirred manually for ca. 1 minute and was stored in a closed vial overnight at room temperature. The next day, 150 mg of this mixture was spread evenly on 10 cm$^2$ of a glass plate. Dryness of the film was determined every 30 minutes by running a needle through the film. 'Dry' was defined when the needle could no longer run through the film, but gave wrinkling of the film's surface. A drying time of 4.8 h was measured.

Comparative Experiment 6—Alkyd Resin with Manganese(I) 2-ethylhexanoate

To 5 g of alkyd resin was added 41.67 mg of Mn(2-EH)$_2$. This led to a Mn level of 0.05 wt % with respect to resin solution (or 0.07 wt % with respect to solid resin). This mixture was stirred manually for ca. 1 minute and was then stored in a closed vial overnight. The next day, 150 mg of this mixture was spread evenly on 10 cm$^2$ of a glass plate. Dryness of the film was determined every 30 minutes by running a needle through the film. 'Dry' was defined when the needle could no longer run through the film, but gave wrinkling of the film's surface. No drying was observed within 8 h.

Comparative Experiment 7

To 5 g of alkyd resin was added 16.8 mg Me$_4$-DTNE dissolved in 0.1 mL ethanol. This mixture was stirred manually for ca. 1 minute and was stored in a closed vial overnight at room temperature. The next day, 150 mg of this mixture was spread evenly on 10 cm$^2$ of a glass plate. Dryness of the film was determined every 30 minutes by running a needle through the film. 'Dry' was defined when the needle could no longer run through the film, but gave wrinkling of the film's surface. No drying was observed within 8 h.

The results of Experiment 1a, 2, 3a, 4, and 5 and Comparative Experiment 6 show that the presence of Me$_4$dtne either dosed together with Mn(2-EH)$_2$ (experiments 1a, 2, 3a, and 4) or as a well-defined dinuclear complex (experiment 5) yield a significantly improved paint drying activity as compared to Mn(2-EH)$_2$ only. Further comparing the results of experiments 1a, 2, 3a, and 4 (mixing Me$_4$dtne ligand with Mn(2-EH)$_2$) with experiment 5 (using the well-defined preformed complex with Me$_4$dtne) shows that the drying time of the Me$_4$dtne ligand/Mn(2-EH)$_2$ mixture is significantly faster than that found for the well-defined complex. For example experiment 2 and 5 (both having 0.05% Mn in the formulation) gave in experiment 2 a drying time of 1.9 h and in experiment 5 of 4.8 h. Even reducing the amount of Mn in experiment by a factor of 5 (to 0.01% Mn) yielded a better drying time (3.7 h) than found for the well-defined complex at a Mn level of 0.05%.

Further, experiments 1a-1d and 3a-3d show that in combination with the Me$_4$dtne ligand, a similar drying time of the alkyd resin is obtained irrespective of the Mn salt used (being Mn(2-EH)$_2$, Mn(acetate)$_2$, Mn(acetate)$_3$, or MnCl$_2$).

Finally, comparative experiment 7 shows that no alkyd resin is obtained when using the Me$_4$dtne ligand without manganese salt or soap.

The invention claimed is:

1. A formulation comprising an oxidatively curable alkyd-based curable resin, and a complex of a chelant of the formula (I):

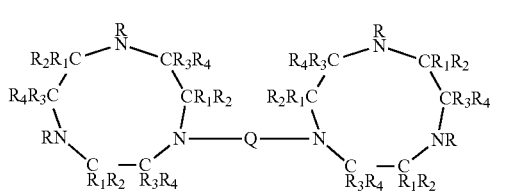

wherein:
   each R is independently selected from hydrogen, C$_1$-C$_{24}$alkyl, CH$_2$CH$_2$OH, CH$_2$COOH and pyridin-2-ylmethyl;
   Q is a C$_2$-C$_6$alkylene bridge, a C$_6$-C$_{10}$ arylene bridge or a bridge comprising one or two C$_1$-C$_3$ alkylene units and one C$_6$-C$_{10}$ arylene unit, which bridge may be optionally substituted one or more times with independently selected C$_1$-C$_{24}$ alkyl groups; and
   each R$_1$, R$_2$, R$_3$, and R$_4$ is independently selected from H, C$_1$-C$_4$alkyl and C$_1$-C$_4$alkylhydroxy, and
   a transition metal ion selected from the group consisting of ions of manganese, iron, cobalt, vanadium and copper,
   wherein the complex is not well-defined, and,
   wherein the formulation is obtained by a method comprising contacting a first composition comprising the oxidatively curable alkyd-based curable resin with a second composition comprising the chelant of formula (I), wherein the second composition further comprises a solvent for the chelant selected from the group consisting of: aliphatic hydrocarbons, alcohols, and mixtures thereof.

2. The formulation of claim 1, wherein Q is ethylene, n-propylene, n-butylene, n-pentylene or n-hexylene.

3. The formulation of claim 1, wherein the chelant is 1,2-bis-(4,7-dimethyl-1,4,7,-triazacyclonon-1-yl)-ethane.

4. The formulation of claim 1, wherein contacting the first composition with the second composition results in a first formulation comprising less than 0.001% by weight of ions of each of manganese, iron, cobalt, vanadium and copper, and wherein the method further comprises contacting said first formulation with a third composition comprising a source of manganese, iron, cobalt, vanadium or copper ions.

5. The formulation of claim 1, wherein the second composition comprises the complex that is not well-defined.

6. A method of preparing a formulation as defined in claim 1, the method comprising contacting said first composition comprising the alkyd-based curable resin with said second composition comprising the chelant of formula (I), wherein the second composition further comprises the solvent for the chelant selected from the group consisting of: aliphatic hydrocarbons, alcohols, and mixtures thereof.

7. The method of claim 6 wherein the method comprises contacting a first formulation comprising the oxidatively curable alkyd-based curable resin and the chelant of the formula (I) as defined in claim 1, with a source of manganese, iron, cobalt, vanadium or copper ions, wherein said first formulation comprises less than 0.001% by weight of ions of each of manganese, iron, cobalt, vanadium and copper.

8. The method of claim 7, wherein Q is ethylene, n-propylene, n-butylene, n-pentylene or n-hexylene or the chelant is 1,2-bis-(4,7-dimethyl-1,4,7,-triazacyclonon-1-yl)-ethane.

9. The method of claim 7, wherein the source of manganese is an optionally hydrated salt selected from the group consisting of MnSO$_4$, MnCl$_2$, MnBr$_2$, Mn(NO$_3$)$_2$, Mn(CH$_3$COO)$_3$, Mn(CH$_3$COO)$_2$, Mn(acetylacetonate)$_2$, Mn(acetylacetonate)$_3$, Mn(octanonate)$_2$, Mn(2-ethylhexanoate)$_2$, Mn(naphthenate)$_2$, and Mn(neodecanoate)$_2$.

10. The method of claim 6, wherein the second composition comprising the chelant of formula (I) comprises the complex that is not well-defined.

11. The method of claim 10, wherein the second composition comprising the complex comprises a mixture of the chelant of formula (I) and a salt of the transition metal ion.

12. A composition resultant from curing of a formulation as defined in claim 1.

13. A kit comprising the first formulation comprising less than 0.001% by weight of ions of each of manganese, iron, cobalt, vanadium and copper, as defined in claim 4, and, separately, a composition comprising transition metal ions selected from the group consisting of manganese, iron, cobalt, vanadium and copper ions.

14. A method comprising applying to a substrate a formulation as defined in claim 1.

* * * * *